US008763474B2

(12) United States Patent
Thonstad (10) Patent No.: US 8,763,474 B2
(45) Date of Patent: Jul. 1, 2014

(54) MULTIPHASE FLOWMETER FOR MEASURING PHYSICAL PROPERTIES OF INDIVIDUAL PHASES IN A MULTIPHASE FLOW

(75) Inventor: Hallvard Thonstad, Oslo (NO)

(73) Assignee: Abbon AS, Lysaker (NO)

( * ) Notice: Subject to any disclaimer, the term of this patent is extended or adjusted under 35 U.S.C. 154(b) by 461 days.

(21) Appl. No.: 13/140,623

(22) PCT Filed: Dec. 17, 2009

(86) PCT No.: PCT/NO2009/000439
§ 371 (c)(1),
(2), (4) Date: Jul. 14, 2011

(87) PCT Pub. No.: WO2010/071447
PCT Pub. Date: Jun. 24, 2010

(65) Prior Publication Data
US 2011/0259120 A1    Oct. 27, 2011

(30) Foreign Application Priority Data

Dec. 19, 2008    (NO) .................................. 20085329

(51) Int. Cl.
*G01F 1/36*    (2006.01)
*G01F 1/74*    (2006.01)
(52) U.S. Cl.
USPC .................................... 73/861.44; 73/861.04
(58) Field of Classification Search
None
See application file for complete search history.

(56) References Cited

U.S. PATENT DOCUMENTS

| 4,075,680 | A | | 2/1978 | Shipp, Jr. | |
|---|---|---|---|---|---|
| 4,961,349 | A | * | 10/1990 | Tanis | 73/861.52 |
| 5,305,638 | A | | 4/1994 | Saghatchi et al. | |
| 6,314,821 | B1 | * | 11/2001 | Allan | 73/861.52 |
| 6,575,045 | B2 | * | 6/2003 | Spielman | 73/861.63 |
| 6,655,221 | B1 | * | 12/2003 | Aspelund et al. | 73/861.04 |
| 7,293,471 | B2 | * | 11/2007 | Lund Bo et al. | 73/861.52 |
| 2004/0244501 | A1 | * | 12/2004 | Nyfors et al. | 73/861.63 |
| 2005/0229717 | A1 | | 10/2005 | Yun et al. | |
| 2008/0148867 | A1 | * | 6/2008 | Nyfors | 73/861.63 |

FOREIGN PATENT DOCUMENTS

| DE | 19632529 A1 | 2/1998 |
|---|---|---|
| EP | 0510774 A2 | 10/1992 |
| WO | 99/67566 A1 | 12/1999 |
| WO | 2006/083170 A1 | 8/2006 |
| WO | 2008/106989 A1 | 9/2008 |

OTHER PUBLICATIONS

International Search Report issued in PCT/NO2009/000439, mailed on Apr. 16, 2010, 3 pages.

(Continued)

*Primary Examiner* — Harshad R Patel
(74) *Attorney, Agent, or Firm* — Osha Liang LLP (57) ABSTRACT

A measuring device and system for measuring physical properties of individual fluids in a multiphase flow flowing through a pipe includes a measuring section with at least two separate and elongate chambers that are formed by at least one longitudinal barrier, at least one of the chambers including a system for measuring the physical properties of the multiphase flow that flows through the chambers. The measuring device is characterized in that the internal diameter of the pipe is smaller at the location in which the measuring section is positioned, in that there is a constriction in the inner pipe wall of the pipe.

7 Claims, 5 Drawing Sheets

(56) References Cited

OTHER PUBLICATIONS

Written Opinion issued in PCT/NO2009/000439, mailed on Apr. 16, 2010, 3 pages.

International Preliminary Report on Patentability issued in PCT/NO2009/000439, completed on Mar. 14, 2011, 7 pages.

Search Report for Norwegian Patent Application No. 2008 5329 dated May 28, 2009 (1 page).

* cited by examiner

MULTIPHASE FLOWMETER FOR MEASURING PHYSICAL PROPERTIES OF INDIVIDUAL PHASES IN A MULTIPHASE FLOW

INTRODUCTION

The present invention relates to a measuring device and system for measuring physical properties of individual phases in a multiphase flow. More specifically, the invention relates to structural details of such a measuring device which makes it particularly well suited for measuring flow rates of up to three different fluids in a mixture, and where these fluids flow unseparated through a pipe in which the measuring device is integrated.

PRIOR ART

Various devices for measuring properties of multiphase flows are well known. Previously focus has been centred on measuring multiphase flows consisting of oil, water and gas. There are therefore many different solutions for multiphase meters that are optimised for measuring these media, and which have their advantages and drawbacks.

The present invention relates to a measuring device which, when operational, constitutes an integral part of a pipe through which a multiphase flow flows. In order to be able to perform distinct measurements on the different phases, the media in each phase, taken separately, should have different physical properties which distinguish them from one another in a multiphase mixture, for example, density of mass and conductivity, such that these properties can be used to separate and characterise the fluids. The measuring device may, for example, be used for volume measurement of oil, water and gas flowing from oil or gas-producing wells, but its use is not limited to this.

WO 2006/083170 describes a flow measurement apparatus for measuring a fluid flow consisting of several phases. In this document there is described a central body in the pipe that is secured by a fin. This forms the ground electrode in capacitive measurements.

WO 99/67566 describes a sectioned pipe for reducing the difference in flow speed between the different phases when transporting a multiphase flow.

DE 19632 529 describes the use of cylindrical electrodes for measuring the capacitance of a fluid flow.

U.S. Pat. No. 5,305,638 describes a flowmeter having a splitter equipped with fins for splitting the flow.

U.S. Pat. No. 6,655,221 describes a multiphase flowmeter having a body centrally located in a pipe through which a multiphase flow flows. The body creates pressure differences in the flow that are measured and combined with measurements of electrical characteristics in order to derive mass flow rates of the different phases. The body is located coaxially in the pipe. Furthermore, electrodes, in one of the solutions described in FIG. 2, are connected to the centrally located body and on the inside on the pipe where the body is located, thereby giving pairs of electrodes, but with one outer common counter-electrode.

A coaxial solution has many measurement-technical advantages over a solution in which the electrodes are placed in the outer walls of a pipe, as shown in FIG. 5 in U.S. Pat. No. 6,655,221. In a coaxial structure the distance between electrode and counter-electrode is small, and consequently the cross-sectional area of the electrodes can be made small without this being at the expense of the sensitivity of the system. A coaxial structure therefore has advantages as regards making the measuring sensor compact.

Figure 5A:
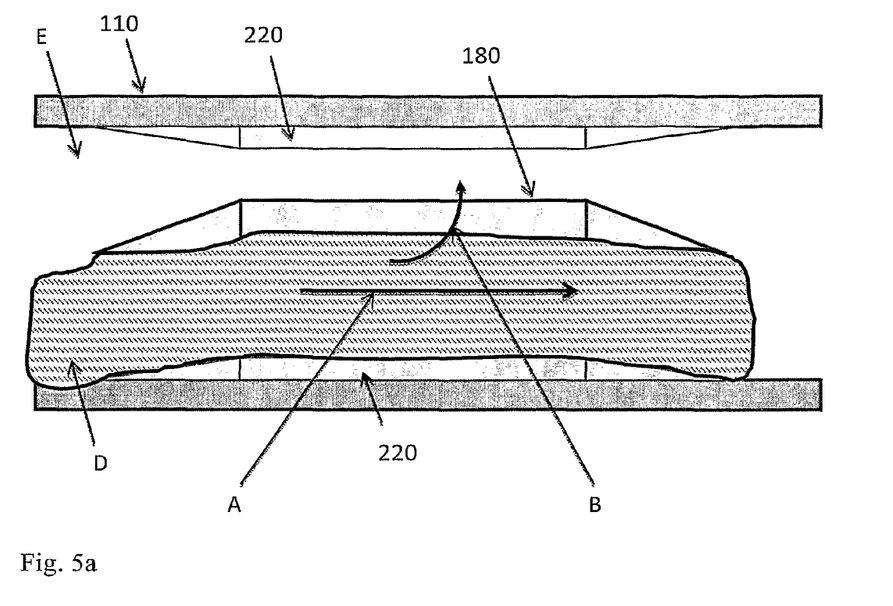
FIG. 5a shows how different phases of fluid can be distributed in the measuring device.
Figure 5B:
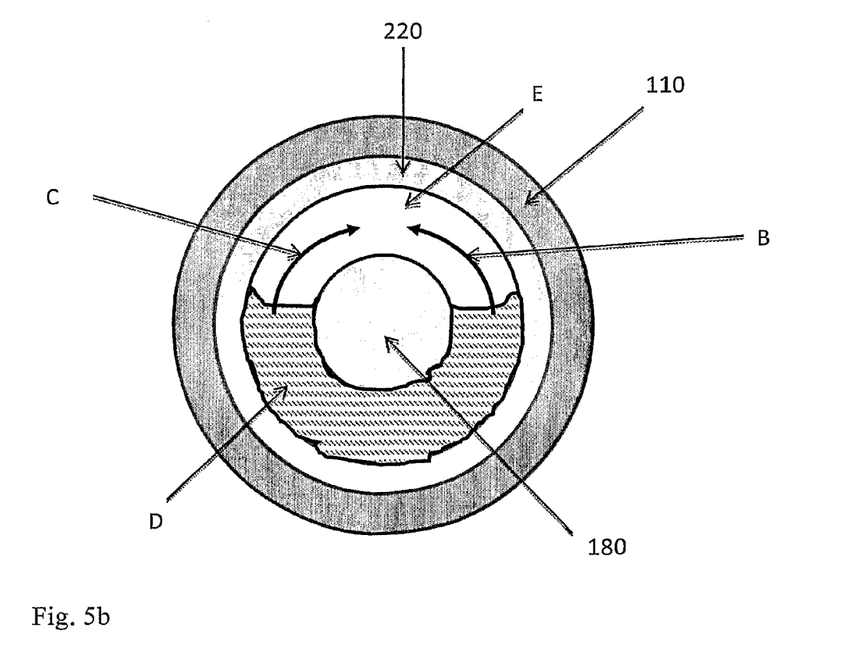

FIG. 2 in U.S. Pat. No. 6,655,221 shows a set of a plurality of ring electrodes that are used for velocity measurements of the flow. In order to make the sensor small, it will be desirable to place the rings as close together as possible. However, this will increase the sensitivity of the sensor to non-radial velocity components. Such non-radial, or spiral, movements in the flow will occur in a multiphase flow that is not homogeneous. This may occur, for example, if there is a predominance of liquid in one part of the cross-section whilst there is mostly gas in another part of the same cross-section, as shown in FIGS. 5a and 5b. When this mixture enters a constriction, both liquid and gas will accelerate and the liquid phase will mix with the gas phase in order to maintain the pressure conditions within the constriction. Liquid will then take paths B and C roughly transverse to the direction of flow. Such non-axial velocity components in the flow will cause increased uncertainty in the total velocity estimate for the flow.

In the present invention, at least one longitudinal wall is introduced between the central body and the inner wall of the pipe. This wall will help to make the multiphase flow unidirectional, and prevent the occurrence of significant flow components transverse to the direction of flow. At the same time, the internal diameter of the pipe is smaller at the location in which a measuring section is positioned, in that there is a constriction in the inner pipe wall of the pipe.

This construction has the effect of diminishing the uncertainty in the velocity measurement, and allows pairs of electrodes used for velocity measurement to be placed closer together. A favourable effect is therefore achieved in that the meter can be made physically small, whilst being more independent of the composition of the flow.

FIG. 2 in U.S. Pat. No. 6,655,221 shows a construction in which the counter-electrode is explicitly described as physically large as compared with the electrodes that are placed on the central body. Such a configuration will help to make the sensor relatively sensitive to local variations close to the large counter-electrode. In the present invention, each electrode has a counter-electrode with the same axial extent as the electrode. In such an embodiment, the sensor will have an equally large spatial resolution at the surface of the counter-electrode as on the electrode itself. This in turn will contribute to sharper detection of the flow, which is also a factor of the present invention that will contribute to a better velocity estimate.

Configuration of the measuring device for measuring a multiphase flow in accordance with the present invention will therefore result in a favourable effect and a better measuring result.

BRIEF DESCRIPTION OF THE INVENTION

The present invention relates to a measuring device for measuring physical properties of individual phases in a multiphase flow flowing through a pipe with a constant diameter upstream and downstream of the measuring device, wherein the measuring device comprises a measuring section with at least two separate and elongate chambers that are formed by at least one longitudinal barrier, at least one of the chambers comprising means for measuring the physical properties of the multiphase flow flowing through the chambers, and wherein the measuring device is characterised in that the internal diameter of the pipe is smaller at the location in which the measuring section is positioned, in that there is a constriction in the inner pipe wall of the pipe.

Further features of the invention are defined in the attached set of claims.

With knowledge of the invention as described in the specification and defined in the set of claims, a skilled person in the art will understand that there will be other embodiments and modifications within the scope of the invention as defined in the attached set of claims.

DETAILED DESCRIPTION

As mentioned, the present invention relates to a measuring device for use in a system for measuring physical properties of individual phases in a multiphase flow flowing through a pipe. The measuring device will be described below with reference to the figures wherein:

FIG. 1b is a cross-sectional view of a measuring device as shown in FIG. 1a;

FIG. 2b is a cross-sectional view of the measuring device in FIG. 2a;

FIG. 3b is a cross-sectional view of the measuring device shown in FIG. 3a;

FIG. 4b is a cross-sectional view of the measuring device shown in FIG. 4a;

FIG. 5b is a cross-sectional view of that shown in FIG. 5a.

Figure 1A:
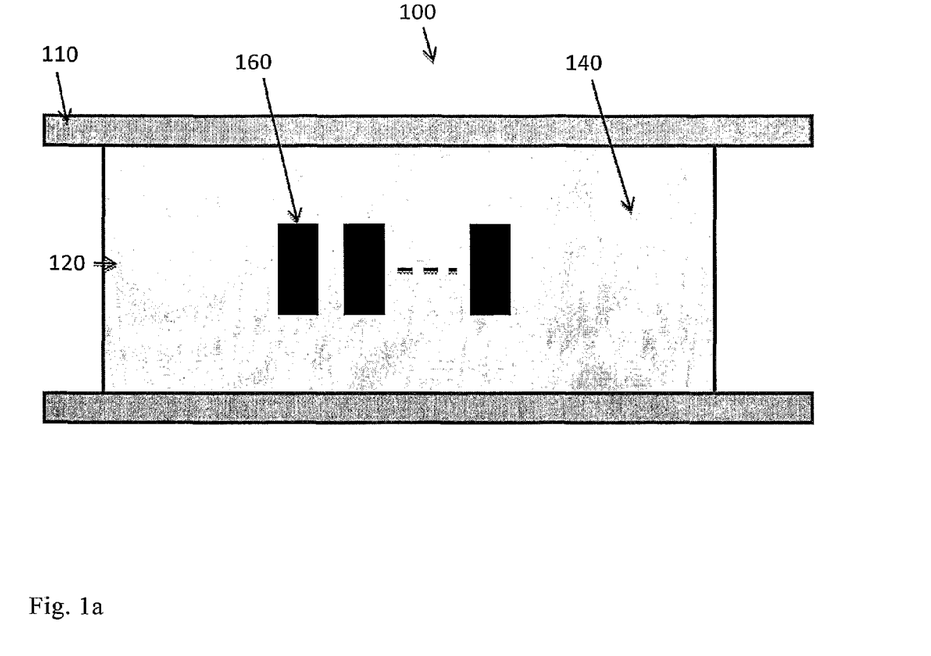
FIG. 1a is a side view of a measuring device.

FIG. 1 a is a side view of the measuring device 100. When the measuring device is operationally installed, it will be in communication with pipes 110 upstream and downstream of the measuring device 100. These pipes 110 have a constant internal diameter which may be the same or different upstream and downstream of the actual measuring device 100. Different internal diameters of connected pipes 110 will not affect the properties or the scope of the characteristic features of the invention.

The measuring device 100 can, by means of a predefined type of connectors, be connected to pipes 110 which transport the multiphase flow. In such an arrangement, pipes 110 which are connected to the measuring device 100 upstream and downstream thereof may have the same internal pipe diameter, and preferably the same external pipe diameter, as the pipes that are in communication with the measuring device 100. The figure further shows a longitudinal barrier 140 which divides the inner volume of the pipe 110 in two. Electrodes 160 are also shown attached to the barrier 140. This will be explained in more detail with reference to FIG. 1b.

Figure 1B:
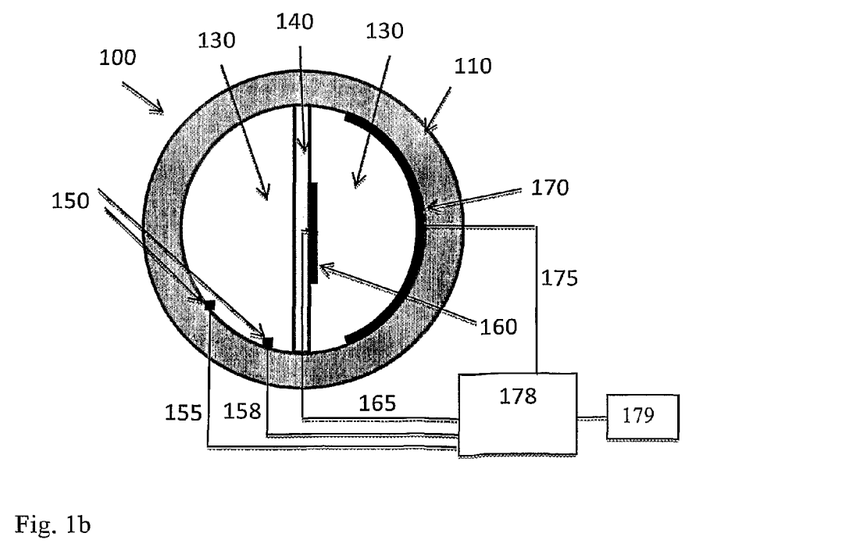

FIG. 1b is a cross-sectional view of the measuring device according to the invention comprising an assembly of several parts. The parts are mounted or inserted in a pipe 110. The pipe 110 is preferably constructed of a material that is suitable for the piping system in which the measuring device 100 is to be mounted. This will typically be steel of a type and quality as defined by the owner of the piping system.

The measuring device 100 is characterised in that it comprises a measuring section 120 with at least two separate and elongate chambers 130 which are formed by at least one longitudinal barrier 140, and where at least one of the chambers 130 comprises means for enabling measurement of the physical properties of the multiphase flow flowing through the chambers 130.

A barrier 140 is preferably mounted symmetrically such that the chambers 130 are of equal size. Over time, equally large amounts of multiphase flow fluids will flow through each chamber 130, provided that the measuring device 100 is mounted such that the fluids, for example, liquid and gas, on average will become evenly distributed. An example of this is if the device is placed downstream of a bend, where it is possible that the liquid will lie against a part of the pipe cross-section after the bend. In that case, the barrier 140 must be positioned such that it divides the liquid fraction, and hence the gas fraction, into to equally large parts.

Although FIG. 1b shows a cross-section of a measuring device with one straight barrier and equally sized chambers 130, the invention should not be considered to be limited to such an embodiment. The barrier may conceivably have, for example, a Y-shape, such that three chambers 130 are formed by barriers 140 which are not straight, but which stand at an angle to one another, and where the chambers are not necessarily of equal size. The end wall of the barrier 140 in the direction of flow may be pointed or rounded, and the thickness may be varied and adapted to the pipe 110 in which it is to be placed.

The said means for measuring the physical properties of the multiphase flow comprise pressure sensors 150 for measuring changes in pressure between different locations with a different cross-section in the measuring device 100. There are preferably pairs of pressure gauges for measuring differential pressure. A pressure sensor can be placed in one or more of the said elongate chambers 130, whilst one or more corresponding pressure sensors can be positioned in a location in front of or after the chambers 130. Changes in pressure and/or differential pressure will thus be capable of being measured between pairs of pressure sensors. The differential pressure can also be measured using other devices that are suitable for measuring pressure differences.

At least one chamber 130 in the measuring section 120 is equipped with at least one set of electrodes 160, 170 in order to be able to measure electric values, and hence electrical properties of the multiphase flow comprising different fluids that flows through the chamber 130. At least one inner electrode 160 is located in connection with the longitudinal barrier 140, and it is electrically insulated from the barrier 140 by means of an electrically insulating material which has good mechanical, thermal and chemical properties as regards resistance to large loads. Furthermore, at least one outer counter-electrode 170 is embedded in the inner wall of the pipe 110 and electrically insulated from this wall. The inner electrode 160 is further connected to an electronics unit 178 by means of an electrical cable 165 that is guided through a duct through the inner barrier or barriers 140 to which the inner electrode 160 is attached, that is to say, one of the barriers 140 between the chambers 130, and then out of the pipe to the electronics unit 178 which is located outside the measuring device 100. The outer counter-electrode 170 is similarly connected to the electronics unit 178 via another electrical cable 175 which is passed through the outer pipe wall. Similarly, the said pressure sensors 150 are connected to the electronics unit 178 via cables 155, 158.

The barrier 140 will help to make the structure of the measuring section 120 robust, and will also advantageously be capable of being used to run electrical cables from said electrodes 160, 170, and from any other means for measuring the physical properties of the multiphase flow, out of the device.

The said electrodes 160, 170 are used to measure capacitance and/or conductance between them. The configuration of an inner electrode 160 and an outer counter-electrode 170 may advantageously be as close as possible to a parallel plate condenser. Although the faces inside the pipe are curved, the electrodes 160, 170 can in length, breadth and shape advantageously be configured such that an approximate parallel plate form is obtained. This is a simple geometry which makes the capacitance relatively easy to calculate mathematically. Furthermore, it will be optimal if the distance between the plates, in addition to being constant, also is as small as possible. In this way maximum sensitivity is obtained, whilst any fringe field effects along the edges are minimal. As mentioned above, it is not desirable that the distance between the electrodes, and hence between the inner barrier 140 and the pipe wall, should be too small since the friction loss may then be higher than desired. An optimal compromise should therefore be sought between these intersecting needs.

Figure 2A:
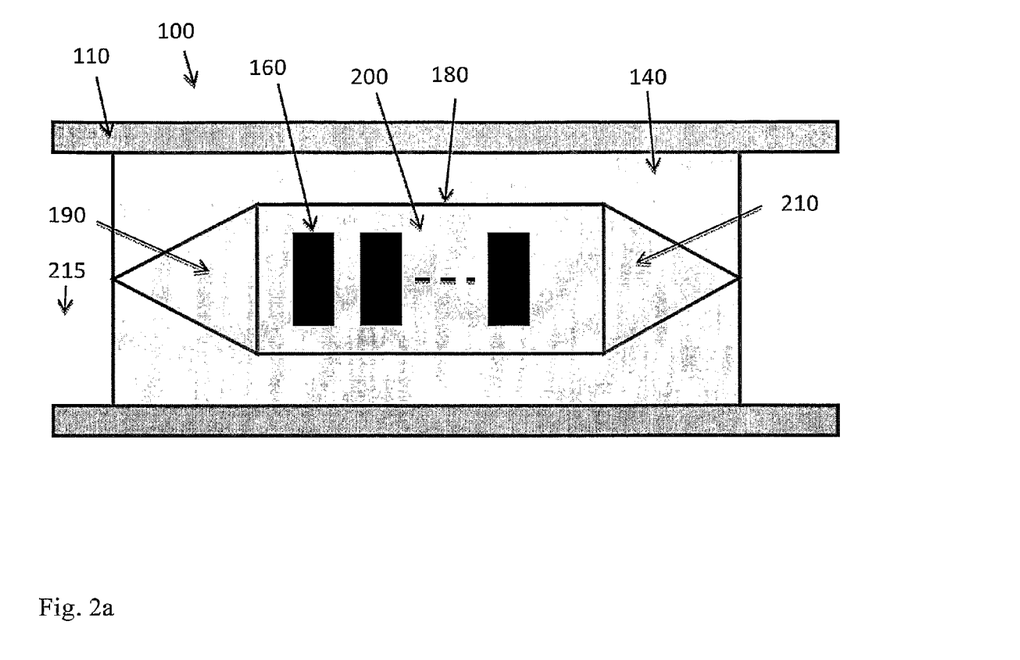
FIG. 2a is a side view of a specific embodiment of the measuring device.

FIG. 2a shows a side view of a specific embodiment of the measuring device 100 according to the invention. It can be seen here that the longitudinal barrier 140 comprises a longitudinal body 180 extending along the barrier 140 and positioned axial thereto, and where the body 180 has an upstream portion 190, a central portion 200, and a downstream portion 210, and where said body 180 has a diameter that is smaller than the internal diameter of the pipe 110 such that the multiphase flow can flow freely past the body 180 on each side of the longitudinal barrier(s) 140, and where inner electrode(s) 160 in this embodiment are mounted on the central portion 200 of the streamlined body 180.

In one embodiment, the upstream portion 190 and the downstream portion 210 of the longitudinal body 180 have an increasing cross-section in the direction of the central portion 200 of the body 180, and the same cross-section and shape as the central portion 200 of the body 180 at the point where the upstream portion 190 and the downstream portion 210 meet the central portion 200.

The form of the central portion 200 of the body 180 will preferably be cylindrical. In one embodiment, the longitudinal extent of the body 180 is longer than the barrier 140 such that the upstream portion 190 and/or the downstream portion 210 has an extent that exceeds the length of the barrier 140.

In another embodiment, the longitudinal extent of the body 180 is as long as the barrier 140, and in yet another embodiment, the longitudinal extent of the body is shorter than the barrier 140 so that the upstream portion 190 and/or the downstream portion 210 has an extent that does not exceed the length of the barrier 140.

In a third embodiment, the longitudinal extent of the body 180 is as long as the barrier 140.

Figure 3A:
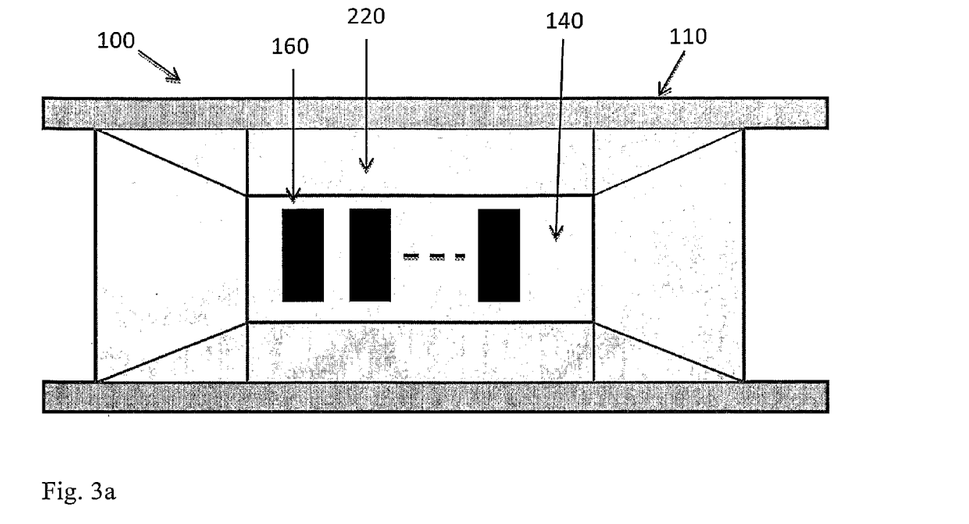
FIG. 3a is a side view of the measuring device according to the invention with a constriction in the inner pipe wall of the pipe.
Figure 3B:
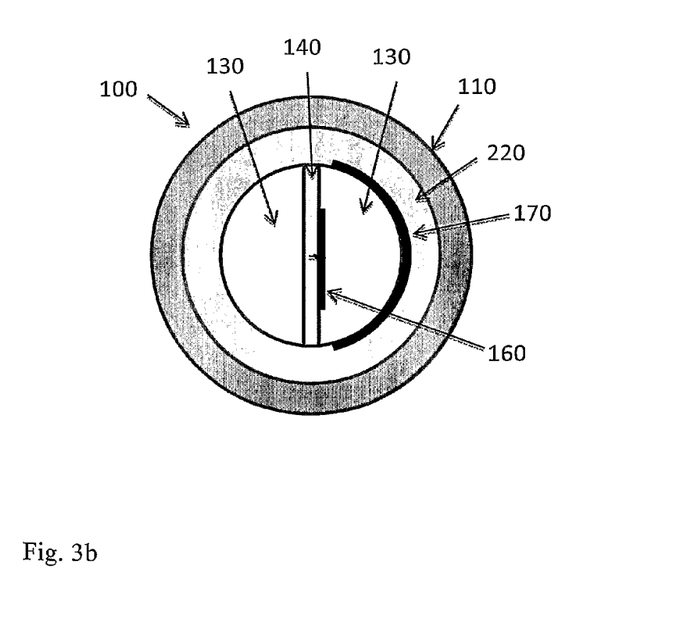

The said body 180 creates, in addition to the barrier 140, a further constriction in the pipe 110 which results in a further increase in the velocity of the flowing medium, with a marked drop in the pressure between a position upstream or downstream of the body 180 and a position close to the body 180 as a result. The outer diameter of the body 180 can be calculated such that the ratio between the cross-sectional area in the chamber 130 that is formed between the outside of the body and the inside of the part of the pipe 110 in which the body 180 is mounted, divided by the area of the pipe 110 in a position 215 beyond the position of the body 180, is within the area ratio that normally applies for standard measuring instruments based on pressure drop. This can result in the distance between the body and the pipe wall being extremely small, such that the friction created by the fluids moving between the faces in the opening is extremely large. To increase this distance, the internal diameter of the pipe 110 can, in the position close to the body 180, be made smaller than in the rest of the length of the pipe 110. Thus, the diameter of the body 180 can also be made smaller. The said constriction is described in more detail with reference to FIG. 3.

The longitudinal body 180 is further equipped with at least one more electrode, which has the same configuration and which is mounted in the same way as the first electrode. These inner electrodes each have a respective counter-electrode that is embedded in the part of the inner pipe wall of the pipe 110 that is opposite the body 180. These electrodes are electrically insulated from the rest of the construction in a similar way as the electrodes on the barrier 140 or on the body 180, by means of an electrically insulating material. Electrical cables 175 are passed from these electrodes, through the wall to the outer part of the pipe 110, and out to the electronics unit 178 on the outside. By using two or more pairs of electrodes, it will be possible to perform velocity measurements of the flow.

Figure 2B:
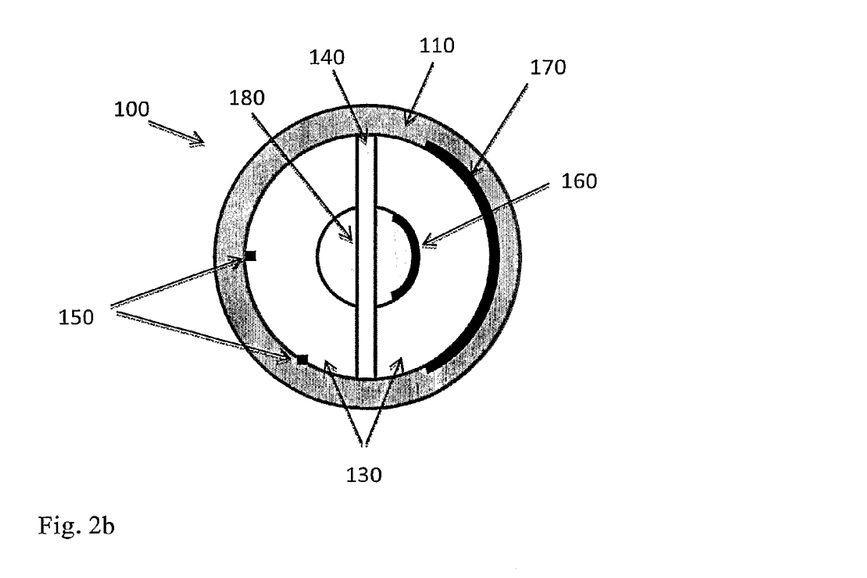

FIG. 2b is a cross-sectional view of a specific embodiment of the measuring device 100. In this figure it is shown how the inner electrode 160 merely covers a part of the cross-sectional circle of the longitudinal body 180, owing to the barrier 140. It can be argued that the electrodes 160, 170 should cover the whole cross-sectional circle of the longitudinal body 180, that is to say, that the inner electrode lies like a band around the central body 180, whilst the outer counter-electrode 170 lies like a similar band around the circle formed by the inner cross-section of the pipe 110. However, a solution of this kind has a disadvantage in that the volume between the electrodes 160, 170 between which the different phases of fluid flow becomes substantially larger, and that there will be an increased likelihood that the fluids in the various sub-volumes are different. The result of this is that the measured capacitance and/or conductance is less representative of that which it is desired to measure. Thus, from what has been described above it can be seen that the presence of the barrier 140 is advantageous for several said reasons.

FIGS. 3a and 3b show the location of a constriction 220 in the inner pipe wall of the pipe. This is the preferred embodiment according to the present invention. With a constriction 220 of this kind, the internal diameter of the pipe 110 is smaller at the location in which the measuring section 120 positioned.

A constriction 220 is especially favourable for increasing the pressure difference between a position outside 215 the measuring section 120, and a position in one of the chambers 130. This will be particularly relevant if the aforementioned central body 180 has a small cross-section, or that the body 180 is not present and inner electrodes 160 are placed directly on the barrier 140 between the chambers 130, as shown in FIG. 3b.

The constriction 220 in the inner pipe wall of the pipe 110 may be so configured that the pipe 110 has a constant smaller diameter at the location of the measuring section 120, and a diameter that gradually increases to the original diameter of the pipe 110 beyond the location of the measuring section 120, as can be seen from FIG. 3a.

Figure 4A:
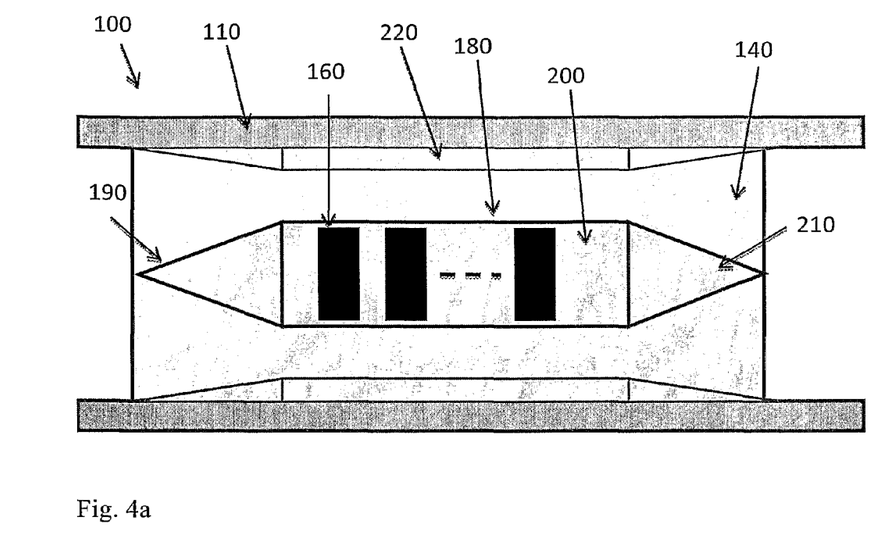
FIG. 4a is a side view of the measuring device with a constriction in the inner pipe wall of the pipe and a longitudinal body in the centre, and which extends along the barrier.
Figure 4B:
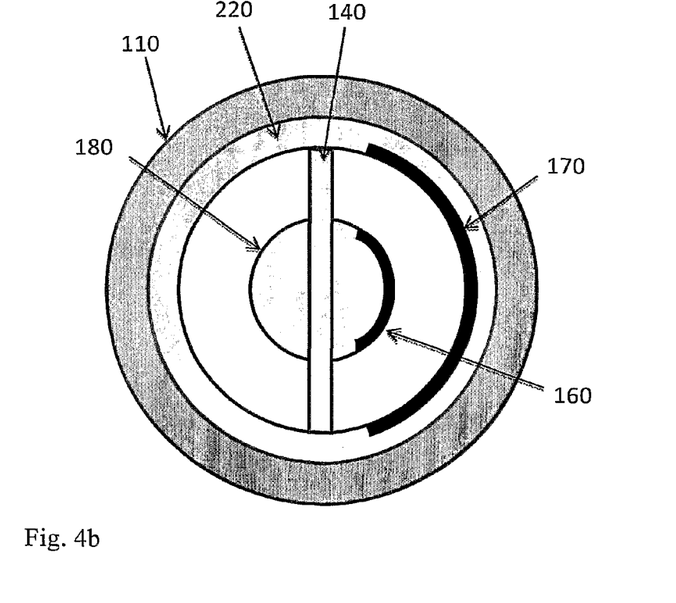

FIGS. 4a and 4b show the measuring device with a constriction 220 in the inner pipe wall of the pipe 110 and a longitudinal body 180 in the centre, and which extends along the barrier 140. In such an arrangement, the constriction 220 need not be as large as in the case where the central body 180 is not present. This is because the presence of the central body 180 will contribute to further pressure differences at locations with different cross-section in the measuring device 100, i.e., in and outside the measuring section 120. Further features shown in FIGS. 4a and 4b correspond to that described in connection with FIG. 1b above.

FIGS. 5a and 5b are intended to illustrate how different phases of fluid can be distributed in the measuring device 100.

As previously mentioned, a major advantage is achieved by dividing the measuring section 120 into separate chambers 130. In this way, it is possible to prevent the occurrence of a spiral flow within the constriction formed at the position close to the barrier 140 because of local pressure variations in this constriction. Without this barrier, this may occur, for example, if there is a predominance of liquid D in a part of the cross-section, whilst there is mostly gas E in another part of the same cross-section, as illustrated in FIGS. 5a and 5b. When this mixture enters a constriction, both liquid D and gas E will accelerate, and the liquid phase will mix with the gas phase in order to maintain the pressure conditions within the constriction. Liquid D will then take paths B and C roughly transverse to the direction of flow. Such non-axial velocity components in the flow will cause increased uncertainty in the total velocity estimate for the flow.

Another major advantage will be to break down any spiral flow, also called swirl flow, that is already found in the flow before it enters the position at which the measurements are made, so that all velocity components in the flow move in a straight line A axially, so as to thus be able to measure a more uniform velocity through the chamber, whole and uninterrupted.

The present invention also comprises a system for measuring and presenting physical properties of individual phases in a multiphase flow flowing through a pipe 110. Such a system comprises the inventive measuring device 100 described above, which comprises a measuring section 120 with at least two separate and elongate chambers 130 that are formed by at least one longitudinal barrier 140. The measuring device 100 further comprises means in at least one of the chambers 130 for enabling measurement of the physical properties of the multiphase flow flowing through the chambers 130. Such means comprise pressure sensors 150 for measuring pressure changes at different locations with different cross-section in the measuring device 100, and electrodes for measuring electrical properties of the multiphase flow, and where at least one inner electrode 160 is provided in connection with the longitudinal barrier 140 and electrically insulated from this barrier 140, whilst at least one outer counter-electrode 170 is embedded in the inner wall of the pipe 110 and electrically insulated from this wall.

The system further comprises measurement-technical means 178 connected to sensors and electrodes for collecting measurement data from the multiphase flow, and presentation means 179 for presenting the different physical properties of each phase of the multiphase flow.

In one embodiment the system further comprises a longitudinal body 180 extending along the barrier 140 and which is positioned axial thereto, the body 180 having an upstream portion 190, a central portion 200, and a downstream portion 210, and said body 180 having a diameter which is smaller than an internal diameter of the pipe 110 such that the multiphase flow can flow freely past the body 180 on each side of longitudinal barrier(s) 140, and wherein said inner electrode(s) 160 are provided on the central portion 200 of the streamlined body 180.

In the above, a pair of electrodes has been described consisting of an inner electrode 160 and an outer counter-electrode 170. Such a construction can be used to measure the total capacitance and conductance that is due to the medium, that is to say, the as many as three fluids in the mixture. If the dielectric and electrical properties of the up to three fluids are different, the total capacitance and conductance measurement will provide information about the ratio of components. This means to say that with the aid of a capacitance/conductance measurement it is possible to establish an equation which includes the fraction of each of the up to three components of the flow. A second such equation is that the sum of the fractions together forms 100% of the pipe cross-section. A third equation is the so-called venturi equation, in which the three fractions are also included. To make use of this equation, the mass density of each individual phase must be known. In addition, the velocity of the flow must be known. The velocity is determined by cross-correlating the signals from at least two pairs of electrodes mounted in the longitudinal direction. The axial difference between the pairs of electrodes is known and the cross-correlation function gives the time delay between the electrode pairs. The velocity is easily determined on the basis of these values.

In view of the characteristic properties of the inventive measuring device 100 which include favourable structural-specific details at the point where the measurements are made, and the system in which this measuring device 100 is used, it will be appreciated that by means of described and known methods of calculation using received measurement data, it will be possible to provide an improved characterisation of the physical properties of the individual phases in a multiphase flow.

The invention claimed is:

1. A measuring device for measuring physical properties of individual fluids in a multiphase flow flowing through a pipe, wherein the measuring device comprises a measuring section with at least two separate and elongate chambers that are formed by at least one longitudinal barrier, at least one of the chambers comprising means for enabling measurement of the physical properties of the multiphase flow that flows through the chambers, the measuring device is characterized in that the internal diameter of the pipe is smaller at the location in which the measuring section is positioned, in that there is a constriction in the inner pipe wall of the pipe, and wherein the means for measuring the physical properties of the multiphase flow comprise pressure sensors for measuring pressure differences at different locations with different cross-section in the measuring device, and electrodes for measuring electrical properties of the multiphase flow, and wherein at least one inner electrode is provided in connection with the longitudinal barrier and electrically insulated from this barrier, whilst at least one outer counter-electrode is embedded in the inner wall of the pipe and electrically insulated from the inner wall.

2. A measuring device according to claim 1, wherein the means for enabling measurement of the physical properties of the multiphase flow are connected to measurement-technical means for collecting measurement data from the multiphase flow, and presentation means for presenting the different physical properties of each fluid in the multiphase flow.

3. A measuring device according to claim 1, wherein the longitudinal barrier comprises a longitudinal body extending along the barrier and which is positioned axially thereon, the body having an upstream portion, a central portion, and a downstream portion, and said body having a diameter that is smaller than an internal diameter of the pipe such that the multiphase flow can flow freely past the body on each side of the longitudinal barrier(s), and wherein said inner electrode(s) are provided on the central portion of the longitudinal body.

4. A measuring device according to claim 3, wherein the longitudinal extent of the body is longer than the barrier such that the upstream portion and/or the downstream portion has an extent that exceeds the length of the longitudinal barrier.

5. A measuring device according to claim 3, wherein the longitudinal extent of the body is shorter than the barrier so that the upstream portion and/or the downstream portion has an extent that is less or equal to the length of the barrier.

6. A measuring device according to claim 3, wherein the longitudinal extent of the body is as long as the barrier.

7. A measuring device according to claim 1, wherein said constriction in the inner pipe wall of the pipe is such that the pipe has a constant smaller diameter at the location of the measuring section, and a diameter that gradually increases to the original diameter of the pipe beyond the location of the measuring section.

* * * * *